INVENTORS
ELMER E. CRIST
SAM PALAZZOLO
RONALD D. COOKE

United States Patent Office 3,508,767
Patented Apr. 28, 1970

3,508,767
ROTARY STEAM JOINT
Elmer E. Crist, Sam Palazzolo, and Ronald D. Cooke, Beloit, Wis., assignors to Beloit Corporation, Beloit, Wis., a corporation of Delaware
Filed Feb. 24, 1969, Ser. No. 801,510
Int. Cl. F16i *15/34;* F16l *17/00, 27/00, 33/16*
U.S. Cl. 285—95                                10 Claims

ABSTRACT OF THE DISCLOSURE

An improved rotary steam joint employes an easily replaceable annular sealing ring having parallel flat faces, one of which bears against a rotating flat seating surface. The sealing ring is non-rotatably carried by a self-aligning carrier ring having a convex spherical surface supported by a mating concave spherical surface of a slidably supported sleeve which is spring loaded to maintain tight contact between the sealing ring and the rotating seating surface. The opposed forces exerted on the sealing ring and its attendant support elements by the pressure within the joint are substantially balanced so that the contact pressure between the sealing ring and the rotating seating surface remains relatively constant throughout the life of the ring regardless of variations in internal pressure. Leak proof cooperation between the various elements of the joint is achieved by means of O ring seals or the like, which eliminate entirely all bellows members, packing glands or similar expensive and troublesome sealing elements heretofore employed in analogous rotary joints.

BACKGROUND OF THE INVENTION

Field of the invention

The present invention relates to rotary joints adapted to conduct gases or liquids between two coaxially aligned conduits, one of which is rotatable relative to the other. More particularly, the invention relates to such rotary joints which include a replaceable non-rotatable sealing ring maintained in non-leaking engagement with a mating rotating seating surface.

Description of the prior art

In many applications, rotary joints are employed to conduct steam or other gases or liquids between a stationary conduit and a rotating conduit or vice versa; for example, to introduce steam into and to remove condensate from a rotary steam heated drying drum employed in a paper making machine. Typically, such a joint comprises a replaceable annular sealing ring made of carbon or other similar material, such ring being flat on one face and spherically convex on the other. The spherical face of the seating ring mates with a corresponding spherical surface of a sleeve slidably supported in generally coaxial alignment with the rotating conduit, the latter being provided with a flat annular flange face adapted to be engaged by the flat face of the sealing ring. The support sleeve and the sealing ring carried thereby are prevented from rotating but the sealing ring is allowed to rock slightly on its spherical face to accommodate minor axial misalignment between the sleeve and the rotating conduit.

Although it is well known to maintain contact pressure between the sealing ring and the face of the rotating conduit by means of one or more springs, the internal pressure within the joint also influences that contact pressure in heretofore known rotary joints. Therefore, if the spring pressure is sufficient to overcome leakage throughout the required operating range of internal pressures, the life of the sealing ring is reduced significantly in the event that such spring pressure is unnecessarily high under average operating conditions. Accordingly, it is also known to incorporate auxiliarly pressure responsive bellows or the like in such joints to provide supplemental control of the sealing ring contact pressure. However, such auxiliary pressure control means obviously add to the expense of the unit and also complicate the process of replacing the sealing ring.

Since the spherical sealing ring surface of the above described prior art joint structure must seat accurately against a mating spherical surface of the non-replaceable sleeve element of the joint, the spherical faces of replacement sealing rings obviously must be made to a very high degree of accuracy to insure leak-proof cooperation between the rings and the support sleeve. In practice, however, such accuracy has proven difficult to achieve at acceptable expense and has given rise in many cases to the use of resilient bellow members or other sealing enclosures as a substitute for or supplement to the use of such mating spherical surfaces to provide a pressure tight self-aligning joint. Although such means for insuring against excessive leakage between the sealing ring and the sleeve member admittedly are effective, the attendant bellows or housing members increase the cost of the unit and may further complicate the sealing ring replacement procedure.

SUMMARY OF THE INVENTION

In accordance with the present invention, a rotary joint of the same general type described above employs a replaceable annular sealing ring comprising perfectly flat parallel end faces which can be produced easily to a high degree of accuracy. This ring is sandwiched between the flat face of the flanged end of the rotatable conduit and a flat end surface of a carrier ring with which the sealing ring is maintained in pressure tight engagement through the agency of an inexpensive O ring gasket. One or more locating pins couple the carrier ring and the sealing ring, thereby preventing relative rotation between those two components. Similar means are also employed to prevent rotation of the carrier ring relative to the joint housing structure, thereby maintaining the sealing ring in non-rotatable relation to that housing. The end of the carrier ring opposite the sealing ring is of concave spherical conformation and seats accurately against a mating convex spherical surface of a tubular cylindrical support sleeve which is carried by the housing member for sliding movement along its axis in substantially coaxial alignment with the rotating conduit member. A spring urges the support sleeve toward the rotatable conduit member, thereby establishing resilient sealing engagement between the abutting faces of the sealing ring and the rotating conduit flange. Since both the carrier ring and the support sleeve comprise permanent components of the joint assembly, their respective spherical mating surfaces can be accurately machined and lapped together to ensure tight cooperation when those surfaces are engaged under the influence of the aforementioned spring. In addition, an annular groove in one of those two spherical surfaces contains another O ring which is slightly flattened against the mating spherical surface to further insure the tightness of the self-aligning joint provided between the carrier ring and the support sleeve. A similar O ring seal is also provided between the support sleeve and the cylindrical tubular support member by which the sleeve is slidably supported within the stationary housing of the joint assembly, thus preventing leakage between those members so that the entire unit is completely sealed without recourse to supplemental housings, bellows members, et cetera.

To enable the sealing ring to engage the rotating flange face under a predetermined optimum sealing pressure independent of the internal pressure within the joint unit, the various axially movable elements within the housing are proportioned such that the internal pressure forces tending to urge the sealing ring toward the flange member are substantially counterbalanced by the opposed internal pressure forces tending to urge the ring in the opposite direction. Accordingly, the net pressure with which the ring is engaged with the flange face is attributable almost entirely to the spring and can be adjusted by varying the characteristics or compression thereof. Preferably, such contact pressure variation is accomplished by slidably supporting the housing on an appropriate base structure so that the entire joint assembly can be adjusted toward or away from the rotating flange; thereby also providing convenient means for replacing the sealing ring without dismantling the joint assembly.

Various means for practicing the invention and other advantages and novel features thereof will be apparent from the following detailed description of an illustrative preferred embodiment of the invention, reference being made to the accompanying drawings in which like reference numerals refer to like elements.

DESCRIPTION OF THE ILLUSTRATIVE PREFERRED EMBODIMENT

Figure 1:
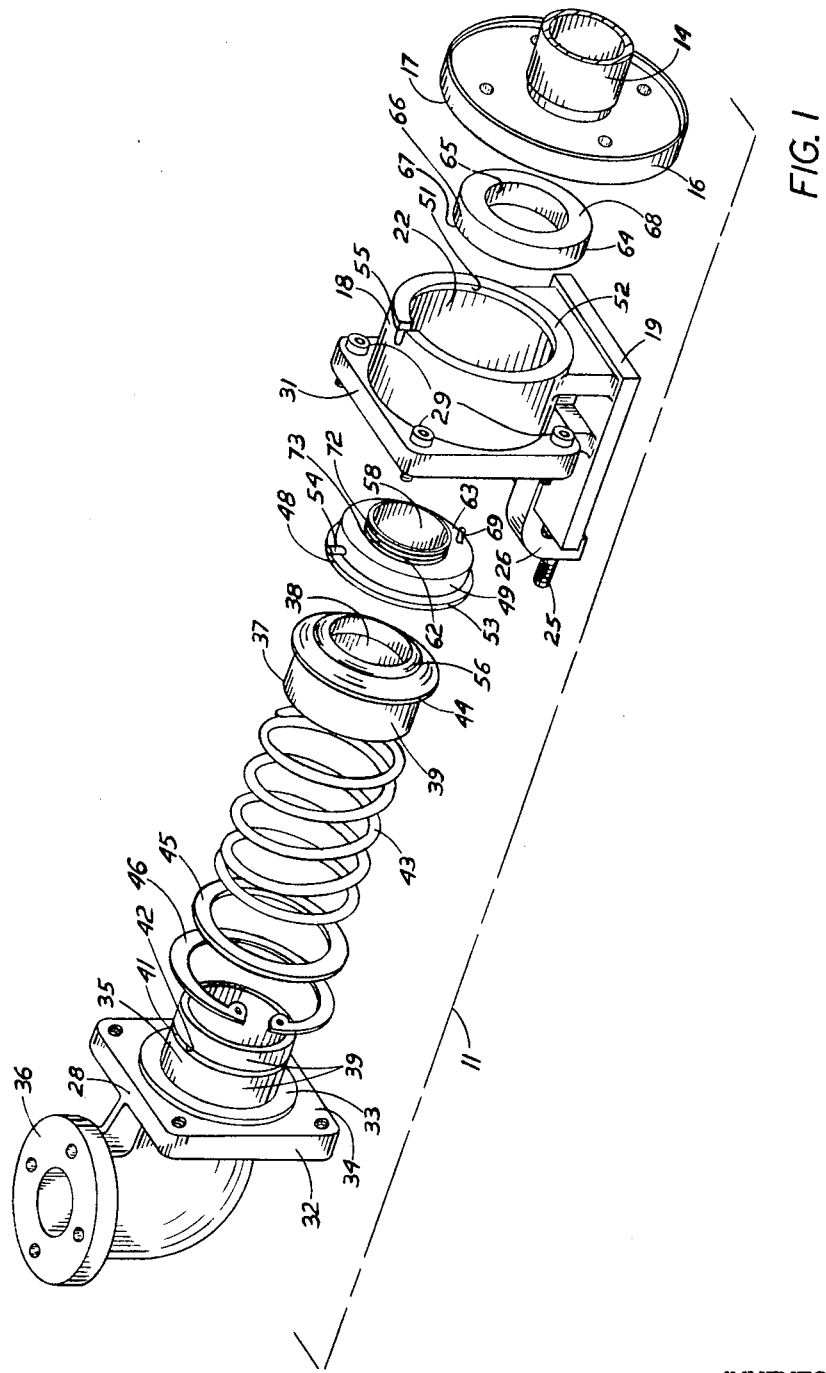
FIGURE 1 is an exploded perspective view of a rotary steam joint or the like in accordance with a preferred illustrative embodiment of the present invention.

In the accompanying drawings, which depict a rotary steam joint or the like in accordance with an illustrative preferred embodiment of the invention, the joint assembly 11 is shown mounted to a frame member 12 which also supports the rotatable tubular shaft 13 of a steam heated dryer drum or other similar device. A rotatable steam inlet pipe 14 extends coaxially through shaft 13 and is rotatable therewith to conduct steam into the rotating drum from a steam supply pipe 15. As shown at 16, a flange member is bolted to shaft 13 and brazed or otherwise joined to inlet pipe 14 to provide a polished flat annular sealing face 17 at right angles to the common rotational axis of the shaft and the inlet pipe.

The rotary joint assembly, per se, comprises a housing member 18 including a flat base plate 19 which is supported on a flat surface 21 of the frame member to position the cylindrical internal bore 22 of the housing member substantially in coaxial alignment with the common rotational axis of shaft 13 and inlet pipe 14. Bolts 23 extend upwardly through elongate slots 24 in the frame member and are threaded into the base plate of housing 18, thereby mounting the latter in generally coaxial alignment with the rotatable steam inlet pipe but allowing the housing to be clamped at different distances from flange 16. An adjusting screw 25 is threaded into frame member 12 and extends through a rigid adjusting ear 26 on base plate 19, thereby allowing the housing member to be forcibly adjusted toward flange member 16 by means of adjusting nuts 27 after bolts 23 have been temporarily loosened.

Body member 28 is adapted to be bolted to housing member 18 by bolts 29 extending through housing flange 31 and into body member flange 32. An annular boss 33 on flange face 34 of the body member surrounds cylindrical support tube 35 of the latter member and fits within the internal bore 22 of the housing member, thereby locating the cylindrical support tube in concentric relation with that bore. At its opposite end, the body member is flanged as shown at 36 to provide conventional means for connecting the joint assembly to steam inlet pipe 15.

Support sleeve 37 is provided with an internal bore 38 adapted to mate with the external cylindrical surface 39 of support tube 35 to maintain the support sleeve in coaxial alignment with the axis of the housing bore while allowing it to move axially with respect to the housing member. An O ring 41 located within external annular groove 42 surrounds support tube 35 and engages the internal bore 38 of the support sleeve to prevent leakage between those two surfaces without preventing relative axial movement therebetween. Compression spring 43 is compressed between shoulder 44 of support sleeve 37 and an abutment washer 45 seated against a locking ring 46 received in an internal annular groove 47 in the housing bore, thereby urging the support sleeve toward the open end of the housing member.

Figure 2:
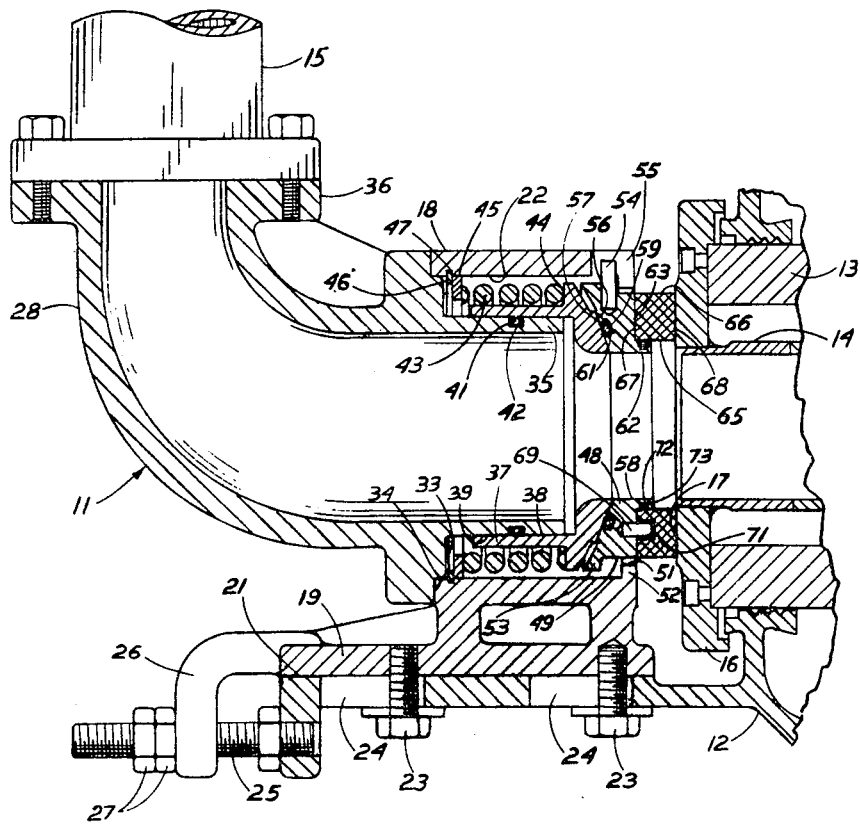
FIGURE 2 is a cross sectional view of the assembled rotary joint structure depicted in FIGURE 1.

Carrier ring 48 includes a cylindrical outer surface 49 adapted to extend loosely through the circular opening 51 defined by the inwardly projecting lip 52 at the end of housing bore 22 adjacent the rotatable flange member 16. A peripheral collar 53, surrounding the opposite end of the carrier ring, is larger than opening 51 but smaller than the internal housing bore. A guide pin 54 extending radially outwardly from the carrier ring is positioned in slot 55 in the housing by initially tilting the ring as it is inserted into the housing bore. Accordingly, when the joint is assembled as shown in FIGURE 2, the carrier ring is maintained in non-rotatable relation to the housing member and cannot pass through opening 51 but is free to deviate somewhat from coaxial alignment with the housing bore.

As shown at 56, the end of support sleeve 37 adjacent carrier ring 49 is provided with an annular convex spherical surface surrounding the internal sleeve bore 38. The adjacent end surface 57 of the carrier ring is of corresponding concave spherical conformation surrounding the central bore 58 of that member. Both such spherical surfaces are accurately machined and preferably lapped together to provide an accurate mating fit. Additionally, another O ring 59 is provided with an annular groove 61 in spherical surface 57 and is flattened slightly against surface 56 to further insure the tightness of the seal established between those two surfaces.

The end of carrier ring 48 facing the rotating flange includes a tubular sleeve 62 coaxial with the central carrier ring bore 58 and projecting beyond the flat annular end face of the ring shown at 63. Sealing ring 64 is made of carbon, a ceramic composition or some other heat resistive material and is in the form of an annulus defined by cylindrical central bore 65, cylindrical external surface 66 and flat parallel end faces 67 and 68. The sealing ring is installed on the carrier ring by sliding its central bore 65 onto the closely mating carrier ring sleeve 62 so that respective faces 63 and 67 of the carrier and sealing rings are in intimate supporting contact with one another. Axial pin 69 projecting from face 63 of the carrier ring is received in a blind hole 71 in the sealing ring, thereby preventing the latter from rotating. Still another O ring 72 is positioned in groove 73 extending around the support sleeve and engages the cylindrical central bore of the sealing ring, thus eliminating the necessity of maintaining absolutely leak-proof contact between the abutting end faces of the sealing and carrier rings.

From the foregoing description, it will be apparent that spring 43 maintains face 68 of the sealing ring in tight contact with face 17 of the rotating flange member 16 under a contact pressure determined by the adjustable relative relation of the joint assembly to the flange face. As previously mentioned, the dimensions of the end surfaces of the support sleeve and the carrier ring which are subjected to internal pressure thrust directed toward the flange member are proportioned wtih respect to those surfaces of the sealing and carrier rings subjected to the opposite internal pressure thrust in a manner whereby such forces are approximately balanced. Hence, the contact pressure between the sealing ring and the rotating flange face is determined principally by spring 43 and can be altered by appropriate adjustment of the joint unit toward or away from the flange; for example, to maintain a predetermined contact pressure as the sealing ring gradually wears thinner. Also, it will be recognized that the spherical supporting and sealing engagement between the support sleeve and the carrier ring allows the sealing ring to be maintained in positive sealing engagement with the rotating flange face notwithstanding slight axial misalignment between the rotatable steam inlet pipe and the axis of the joint assembly.

Since the carrier ring cannot pass through opening 51 of housing member 18, the joint unit, per se, remains in its assembled condition as long as flanges 31 and 32 are bolted together. Consequently, replacing the sealing ring merely involves shutting off the steam supply, loosening bolts 23 and adjusting nuts 27, sliding the joint assembly away from the rotating flange by flexing steam inlet pipe 15, replacing the readily accessible sealing ring and then readjusting the unit on the machine frame to establish the required contact pressure between the sealing ring and the flange face. Inasmuch as no actual disassembly of the unit is necessary, the relatively short time required for such sealing ring replacement will in many cases allow that operation to be performed without stopping the rotation of the dryer or equivalent machine with which the joint is associated.

Although the illustrative preferred embodiment of the invention comprises only a single steam passageway, it will be apparent that the same type of structure can be employed in an analogous joint which includes a plurality of concentric passageways, e.g. so called "duplex" joints. Furthermore, as previously suggested, the subject joint is applicable not only to handling steam but also to other gases or liquids, either under pressure or vacuum conditions.

The invention has been described in detail with particular reference to a preferred embodiment thereof, but it will be understood that variations and modification can be effected within the spirit and scope of the invention as described hereinbefore.

We claim:

1. A rotary steam joint assembly for establishing pressure tight communication between relatively rotating members including a stationary conduit and a rotating conduit including a flat annular end face, said joint assembly comprising:
   (a) a housing member,
   (b) a tubular support sleeve member supported for axial movement by said housing member in generally coaxial relation to the rotational axis of said rotating conduit, said support sleeve member including an annular spherical end surface facing said flat annular end face of said rotating conduit,
   (c) a carrier ring provided at one end thereof with a spherical annular face mating with said annular spherical end surface of said support sleeve member to provide a self-aligning joint between said support sleeve member and said carrier ring, said carrier ring including at its other end a flat annular sealing ring support surface,
   (d) a replaceable sealing ring in the form of a cylindrical annulus including flat parallel end faces,
   (e) sealing ring positioning means positioning said sealing ring in concentric relation to said carrier ring with one flat end surface of said sealing ring in supported engagement with said flat annular sealing ring support surface of said carrier ring,
   (f) spring means axially urging said support sleeve member toward said rotating conduit to thereby resiliently sandwich said sealing ring between said sealing ring support surface of said carrier ring and said flat annular end face of said rotating conduit with the other end of said carrier ring in pressure tight supported engagement with said annular spherical end surface of said support sleeve member,
   (g) rotation preventing means for preventing rotation of said sealing ring relative to said housing, and
   (h) means for establishing pressure tight communication between said stationary conduit and the interior of said tubular support sleeve member.

2. A rotary joint assembly according to claim 1 in which said housing member includes a cylindrical support tube immovable relative to said housing member and positioned thereby in generally coaxially alignment with the rotational axis of said rotating conduit member, said tubular support sleeve member being slidably supported on said support tube in mating engagement therewith for axial movement relative to said flat annular end face of said rotating conduit.

3. A rotary joint assembly according to claim 2 including an O ring seal between said cylindrical support tube and said tubular support sleeve.

4. A rotary joint assembly according to claim 1 in which said housing member includes an internal bore surrounding and concentric with said support sleeve member, said spring means comprising a compression coil spring encircling said support sleeve member within said bore.

5. A rotary joint assembly according to claim 4 in which said housing member includes a peripheral inwardly projection lip at the end of said bore adjacent said rotating conduit, the end portion of said carrier ring provided with said spherical annular face being located within said bore and being larger than the opening defined by said inwardly projecting lip to prevent axial movement thereof past said lip.

6. A rotary joint assembly according to claim 4 in which said sealing ring positioning means comprises a tubular sleeve projecting axially from said flat annular sealing ring support surface of said carrier ring toward said rotating conduit member, said tubular sleeve mating with the cylindrical internal bore of said sealing ring to support the latter on said carrier ring with said flat annular sealing ring support surface of said carrier ring in supporting engagement with the corresponding flat end face of said sealing ring.

7. A rotary joint assembly according to claim 6 including an O ring seal between said tubular support sleeve and said internal cylindrical bore of said sealing ring.

8. A rotary joint assembly according to claim 6 wherein said rotation preventing means includes a pin projecting axially from said flat annular sealing ring support surface of said carrier ring and received in a mating hole in said sealing ring to prevent rotation of the latter relative to said carrier ring.

9. A rotary joint assembly according to claim 1 in which said housing member includes means for mounting the same to a stationary support frame and an adjusting screw to adjust said housing member on said support frame along the direction of the axis of said rotating conduit member.

10. A rotary joint assembly according to claim 1 wherein the combined area of the end surfaces of said support sleeve member and said carrier ring subjected to internal pressure thrust directed toward said rotating conduit member is substantially equal to the combined area of those surfaces of said sealing ring and said carrier ring subjected to the opposite internal pressure thrust, whereby the force with which said sealing ring is urged into engagement with said flat annular end face of said rotating conduit is determined substantially by said spring means.

References Cited

UNITED STATES PATENTS

| | | | |
|---|---|---|---|
| 2,305,725 | 12/1942 | Meyer | 285—281 |
| 2,407,445 | 9/1946 | Phillips | 285—278 X |
| 2,744,774 | 5/1956 | Wist | 277—87 X |
| 2,873,538 | 2/1959 | Shumaker | 285—134 X |
| 3,405,959 | 10/1968 | Walker | 285—279 X |

FOREIGN PATENTS

| | | |
|---|---|---|
| 935,103 | 6/1948 | France. |
| 1,164,768 | 3/1964 | Germany. |
| 7,209 | AD1903 | Great Britain. |

DAVID J. WILLIAMOWSKY, Primary Examiner

D. W. AROLA, Assistant Examiner

U.S. Cl. X.R.

277—27, 84, 85; 285—272